United States Patent
Chappuis et al.

(10) Patent No.: US 6,779,829 B2
(45) Date of Patent: Aug. 24, 2004

(54) INNER DOOR FOR AN AUTOMOTIVE VEHICULAR DOOR ASSEMBLY

(75) Inventors: Laurent Bernard Chappuis, Grosse Pointe Park, MI (US); Michael William Danyo, Trenton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 10/342,934

(22) Filed: Jan. 15, 2003

(65) Prior Publication Data

US 2003/0227193 A1 Dec. 11, 2003

Related U.S. Application Data

(62) Division of application No. 10/064,058, filed on Jun. 5, 2002, now Pat. No. 6,550,846.

(51) Int. Cl.[7] ............................................. B62D 25/04
(52) U.S. Cl. ............................... 296/146.5; 296/146.7; 296/146.6; 296/146.9; 49/502; 49/503
(58) Field of Search ........................... 296/146.5, 146.7, 296/146.6, 146.9, 146.11; 49/502, 503

(56) References Cited

U.S. PATENT DOCUMENTS

| 4,434,580 A | * | 3/1984 | Engelsberger et al. ... 296/146.6 |
| 4,934,099 A | * | 6/1990 | Maekawa et al. .............. 49/502 |
| 5,536,060 A | * | 7/1996 | Rashid et al. ............. 296/146.5 |
| 5,857,732 A | * | 1/1999 | Ritchie ..................... 296/146.5 |
| 2002/0095870 A1 | * | 7/2002 | Praud et al. .............. 296/146.7 |

FOREIGN PATENT DOCUMENTS

| EP | 000476351 A1 | * | 3/1992 | ................... 49/502 |
| JP | 404356220 A | * | 12/1992 | ............ 296/146.11 |
| JP | 405147441 A | * | 6/1993 | .............. 296/146.9 |
| JP | 405229343 A | * | 9/1993 | .............. 296/146.9 |

* cited by examiner

*Primary Examiner*—Lori L. Coletta
(74) *Attorney, Agent, or Firm*—Gigette M. Bejin

(57) ABSTRACT

An automotive door assembly (10) includes an inner door (30) having an inner panel (40). The inner panel (40) has a first seat (44) and a second seat (46) integrally formed therein. The first seat (44) has a first side member (50) fixedly attached thereto for separating an exterior of the door assembly (10) from a door cavity thereof. The first side member (50) also reinforces the automotive door assembly (10). Likewise, the second seat (46) a second side member (90) has fixedly attached thereto for separating the exterior of the door assembly (10) from the door cavity thereof. The second side member (90) also reinforces the automotive door assembly (10). The inner panel (40), the first side member (50), and the second side member (90) have an outer door (18) attached thereto for enclosing the door cavity.

11 Claims, 4 Drawing Sheets

INNER DOOR FOR AN AUTOMOTIVE VEHICULAR DOOR ASSEMBLY

CROSS-REFERENCE TO RELATED APPLICATION

The present application is a divisional application claiming priority from U.S. Nonprovisional Application Ser. No. 10/064,058 filed on Jun. 5, 2002, now U.S. Pat. No. 6,550,846 entitled "Aluminum Automotive Door Assembly," assigned to the assignee of the parent application, and incorporated herein by reference.

BACKGROUND OF INVENTION

The present invention relates generally to automotive door assemblies, and more particularly to inner door for automotive door assemblies that allow for the incorporation of aluminum metal therein.

Existing door assemblies typically include a steel inner wall. The inner wall is usually provided by stamping sheet metal with a sufficient depth of draw so as to form extensive side portions projecting therefrom. The length of the side portions may determine a size of the door cavity and a thickness of the door assembly. The structure of the side portions also typically provides a styling to the door assembly. The door cavity normally has an intrusion beam, the window driving mechanism, and a variety of other hardware contained therein. Consequently, the side portions must be of sufficient length to provide the necessary space within the door cavity.

Steel typically is used to form the inner wall because it has sufficient ductility for undergoing the required depth of draw for forming the side portions. Unfortunately, some metals have lower formability and are consequently damaged when drawn to the require depth. Typical damage to the metal includes wrinkling of the metal, tearing of the metal, and various other defects.

One such metal having lower formability than steel is aluminum. Further, aluminum does not have sufficient ductility for allowing an extensive elongation thereof during manufacture. It is widely known that automotive manufacturers are incorporating aluminum into automotive vehicles to improve fuel economy, emissions, and vehicle performance. Aluminum may reduce the overall vehicular weight without sacrificing the desired performance of vehicular components. Thus, it is disadvantageous that certain metals, i.e. aluminum, with low formability characteristics typically cannot be incorporated into existing door assemblies.

Further, the side portions of existing door assemblies typically have end portions of the intrusion beam attached thereto. Once all hardware is mounted to the inner wall, the side portions have an outer perimeter of an outer wall mounted thereto.

The side portions also support the door assembly in order to reduce the amount of door sag. The side portions typically have reinforcements attached thereto for increasing resistance to door sag. In particular, the reinforcements strengthen mounting portions of the inner wall for attaching a hinge device and a latch device to the door assembly. Further, the reinforcements may also stiffen a window frame integrally formed within the inner wall of the door.

The use of metals having low formability characteristics does not allow for existing door assemblies to have the side portions extensively drawn from the inner wall. Thus, the aforementioned benefits of the side portions would be forgone.

Therefore, a need exists to provide a door assembly that allows for the use of aluminum metal, maintains torsional rigidity of the door, increases stiffness of the window frame, permits a proper attachment for an intrusion beam, and reinforces attachment areas for receiving a hinge device and a latch device.

SUMMARY OF INVENTION

The present invention provides an automotive door assembly (door assembly). In carrying out the present invention, the door assembly allows for the use of metals having low formability, the improvement of manufacture, and the improvement of performance.

The door assembly includes an inner door having an inner panel. The inner panel has a first seat and a second seat integrally formed therein. The first seat has a first side member fixedly attached thereto for separating an exterior of the door assembly from a door cavity thereof. The first side member also reinforces the automotive door assembly. Likewise, the second seat has a second side member fixedly attached thereto for separating the exterior of the door assembly from the door cavity thereof. The second side member also reinforces the automotive door assembly. The inner panel, the first side member, and the second side member have an outer door attached thereto for enclosing the door cavity. Preferably, aluminum metal constitutes at least one of the inner panel, first side member, and second side member.

One advantage of the present invention is that aluminum and other various light-weight metals having low formability characteristics may be used for the door assembly. Another advantage of the present invention is that the stiffness of the window frame is reinforced. Still yet another advantage of the present invention is that torsional rigidity in the door assembly is reinforced.

These and other advantages of the present invention will become apparent from the following description of the invention, when viewed in accordance with the accompanying drawings and appended claims.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

Figure 1:
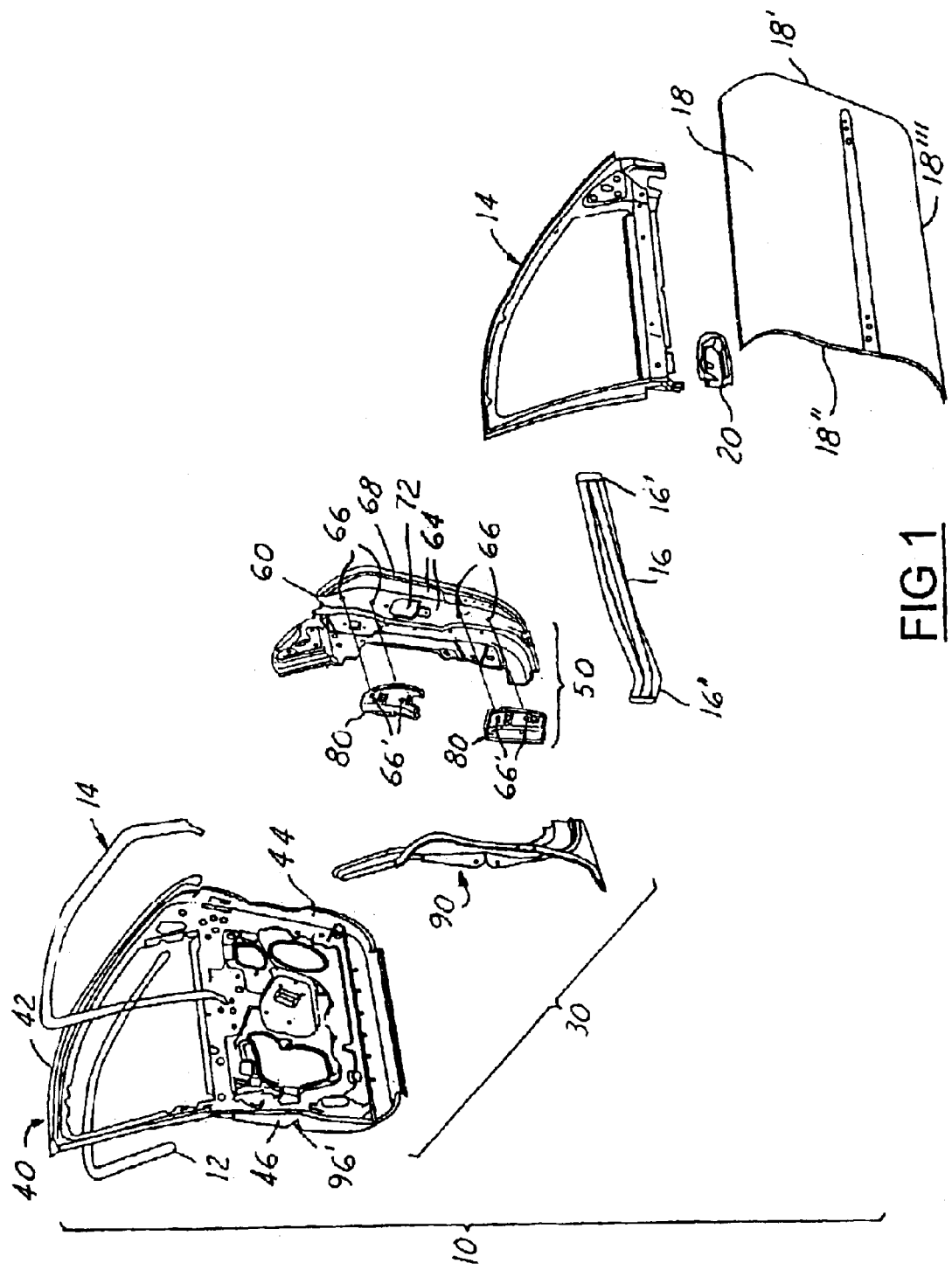
FIG. 1 is a perspective exploded view of an automotive door assembly according to a preferred embodiment of the present invention.

In the following figures, the same reference numerals are used to identify the same components in the various views.

Referring to FIG. 1, there is generally illustrated a perspective exploded view of an automotive door assembly 10 (door assembly) according to a preferred embodiment of the present invention. The door assembly 10 generally includes an inner door 30 having a window frame flange 42 integrally formed therein. Typically, the window frame flange 42 has a seal retainer 12 and at least one window frame reinforcement 14 attached thereto. The inner door 30 usually has an intrusion beam 16 mounted therein for reducing intrusion into the vehicular body structure. The inner door 30 is usually mated to an outer door 18 having a handle 20 formed in its outer surface.

The inner door 30 includes an inner panel 40 employed for mounting various kinds of door hardware thereto. Examples of such hardware include a window driving mechanism, a locking mechanism, and a stereo speaker. The inner panel 40 opposes shear forces applied to the door assembly 10 so as to provide torsional rigidity thereto. The window frame flange 42 also extends from the inner panel 40 to support an outer edge of a window in a closed position.

Furthermore, the inner panel 40 has a first seat 44 and a second seat 46. The first seat 44 and the second seat 46 preferably are flanges extending from opposing ends of the inner panel 40. Typically, the first seat 44 extends from a front portion of the inner door 30 and the second seat 46 extends from the rear portion of the inner door 30. Of course, the orientation of the seats 44, 46 may be otherwise as desired.

The inner door 30 also includes a first side member 50 and a second side member 90 fixedly coupled to the first seat 44 and the second seat 46, respectively.

Figure 2:
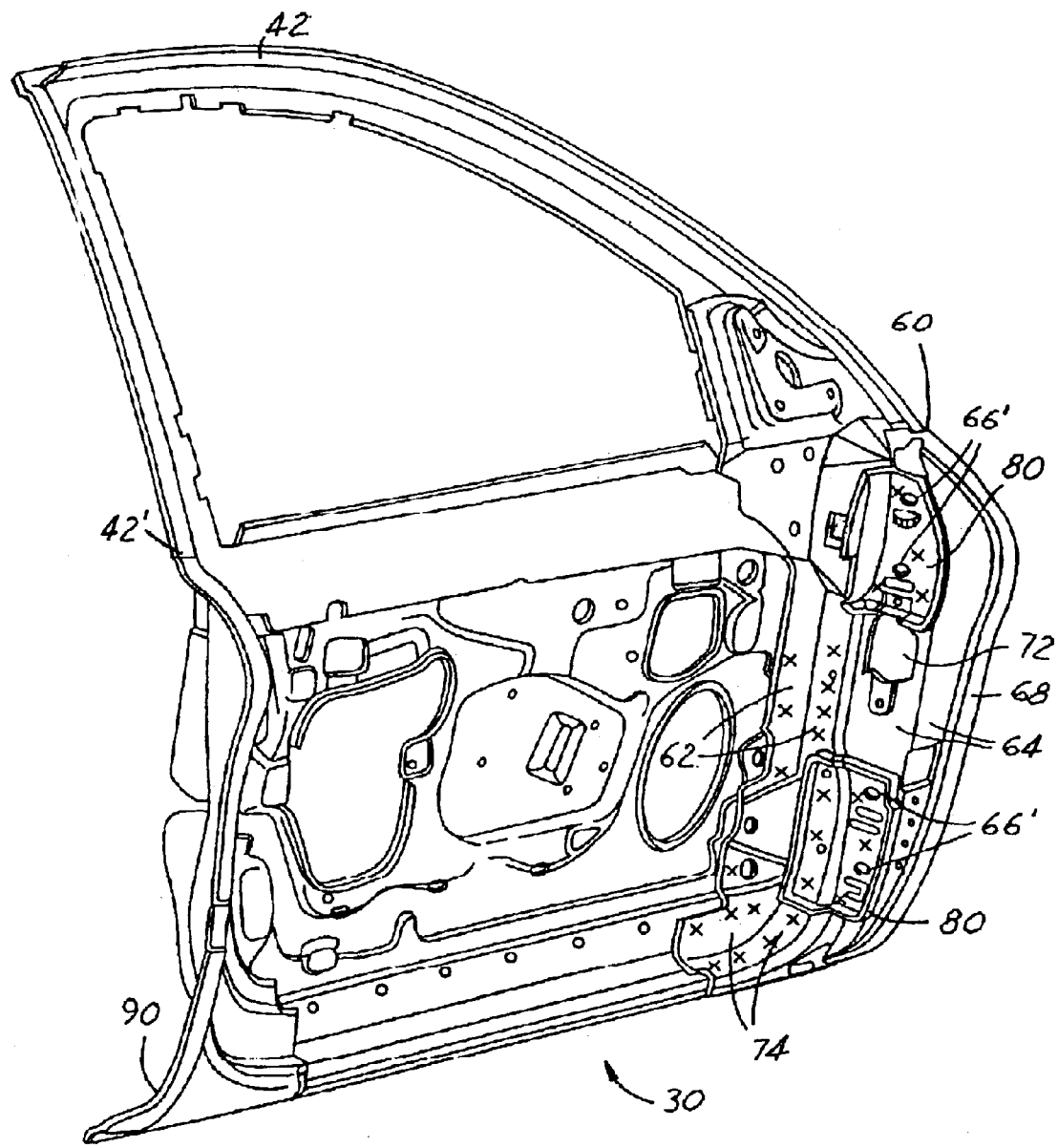
FIG. 2 is a perspective view of an inner door with a first side member incorporated therein according to a preferred embodiment of the present invention.

Turning now to FIGS. 1 and 2, the first side member 50 preferably extends in a generally perpendicular direction from the inner panel 40. The first side member 50 separates an exterior of the door assembly 10 from a door cavity contained therein. Moreover, the first side member 50 determines the thickness of the door assembly 10 and consequently the size of the door cavity.

The first side member 50 includes a wall member 60. The wall member 60 preferably is a single piece of metal stamped with a sufficient depth of draw in order to provide the desired thickness of the door assembly 10 without causing damage to the metal. Certain metals, i.e. aluminum, have lower formability characteristics than steel. Therefore, as an item separate from the inner panel 40, the wall member 60 is processed in such manner so as to allow the door assembly 10 to achieve the required dimensions.

The wall member 60 has a mating portion 62 that is intended to be securely mounted to the first seat 44 of the inner panel 40. Preferably, a plurality of two-sided fasteners attaches the mating portion 62 to the first seat 44. The use of the two-sided fasteners typically allows for a faster manufacturing cycle time and a more accurate manufacture of the door assembly within the design tolerances. The two-sided fasteners may be a plurality of self-piercing rivets, a resistant spot welding fastening, and various other two-sided fasteners as desired. As is known in the art, extensive fusion welding of a metal having a high coefficient of thermal expansion typically causes the metal to grow during manufacture which can result in a construction of the door assembly beyond design tolerances. Fusion welding components together may also require a significant amount of time. Despite the advantages of a two-sided fastener over other fastening mechanisms, it is clear that various other fastening mechanisms may also be used.

The wall member 60 also has a divider portion 64 for separating the exterior of the door assembly 10 from the door cavity. The divider portion 64 also serves as an attachment point between the door assembly 10 and the automotive vehicle. The divider portion 64 has at least one hinge hole 66 formed therethrough for allowing a hinge device integrated within the automotive vehicle to enter therethrough. Preferably, the divider portion 64 has about four hinge holes 66 for permitting two hinge devices to extend therethrough. A bolt is typically applied to each hinge device for attaching the door assembly 10 to the automotive vehicle. Naturally, the number of hinge holes 66 may be more or less than what is disclosed in this example.

The first side member 50 further includes at least one plate 80. The plate 80 reinforces the divider portion 64 in areas proximate to the hinge hole 66 therein. Preferably, the wall member 60 has two plates 80 fixedly coupled thereto and adjacent to the hinge holes 66. The plates 80 typically have at least one hinge aperture 66' formed therein for permitting the hinge device to extend therethrough. For example, each plate 80 may have one hinge aperture 66' formed therein to correspond to each hinge hole 66 formed within the divider portion 64.

The plate 80 reinforces the wall member 60 in order to reduce flexing thereof caused by forces imparted by the hinge device. The strengthening of the wall member 60 thus increases the overall rigidity of the door assembly 10. For example, the plate 80 may improve resistance to both door sag and torsional deflection of the door assembly 10. Preferably, two-sided fasteners are employed to attach the plate 80 to the divider portion 64, but a variety of other fasteners may be used.

Moreover, the divider portion 64 of the wall member 60 typically has a brace flange 68 integrated therein for increasing the strength of the wall member 60. The brace flange 68 strengthens the wall member 60 by opposing forces that can typically cause the wall member 60 to flex. Thus, the brace flange 68 typically reduces the occurrence of door sag.

The wall member 60 may also have an opening 72 for permitting electrical wires to pass therethrough for connecting to hardware contained within a door cavity of the door assembly 10. Typically, electrical wires pass through the opening 72 to supply power to a window driving mechanism, a locking mechanism, or a stereo speaker.

The wall member 60 also has a boot portion 74 which is primarily intended to provide torsional rigidity to the door assembly 10. As is known in the art, the corners of the door assembly 10 are critical areas for opposing torsional deformation of the door assembly 10. The boot portion 74 typically constitutes a front bottom corner of the door assembly 10 so as to most efficiently oppose torsional forces imparted upon the door assembly 10. The torsional reinforcement preferably is accomplished by fixedly attaching the boot portion 74 to the first seat 44 of the inner panel 40 at a bottom front corner of the door assembly 10.

Figure 3:
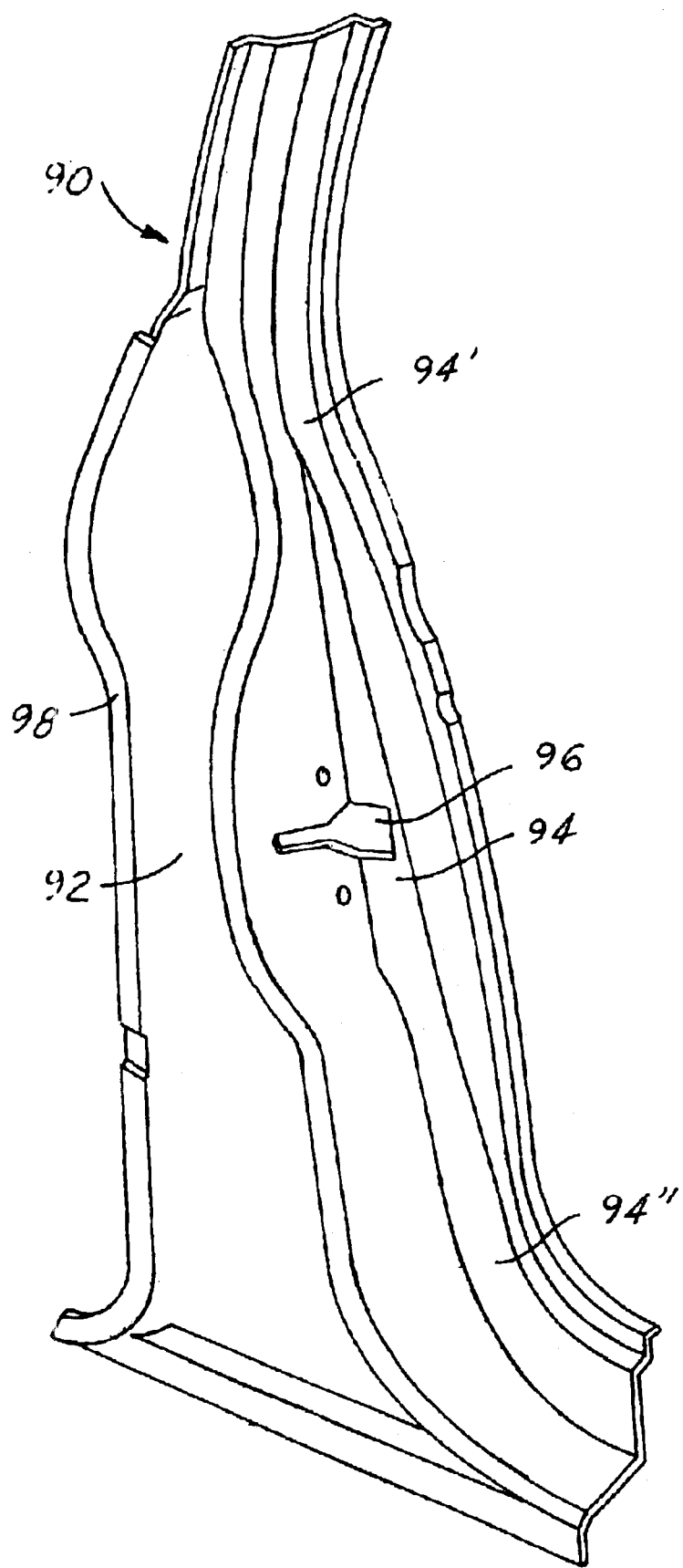
FIG. 3 is a perspective view a second side member of an automotive door assembly according to a preferred embodiment of the present invention.
Figure 4:
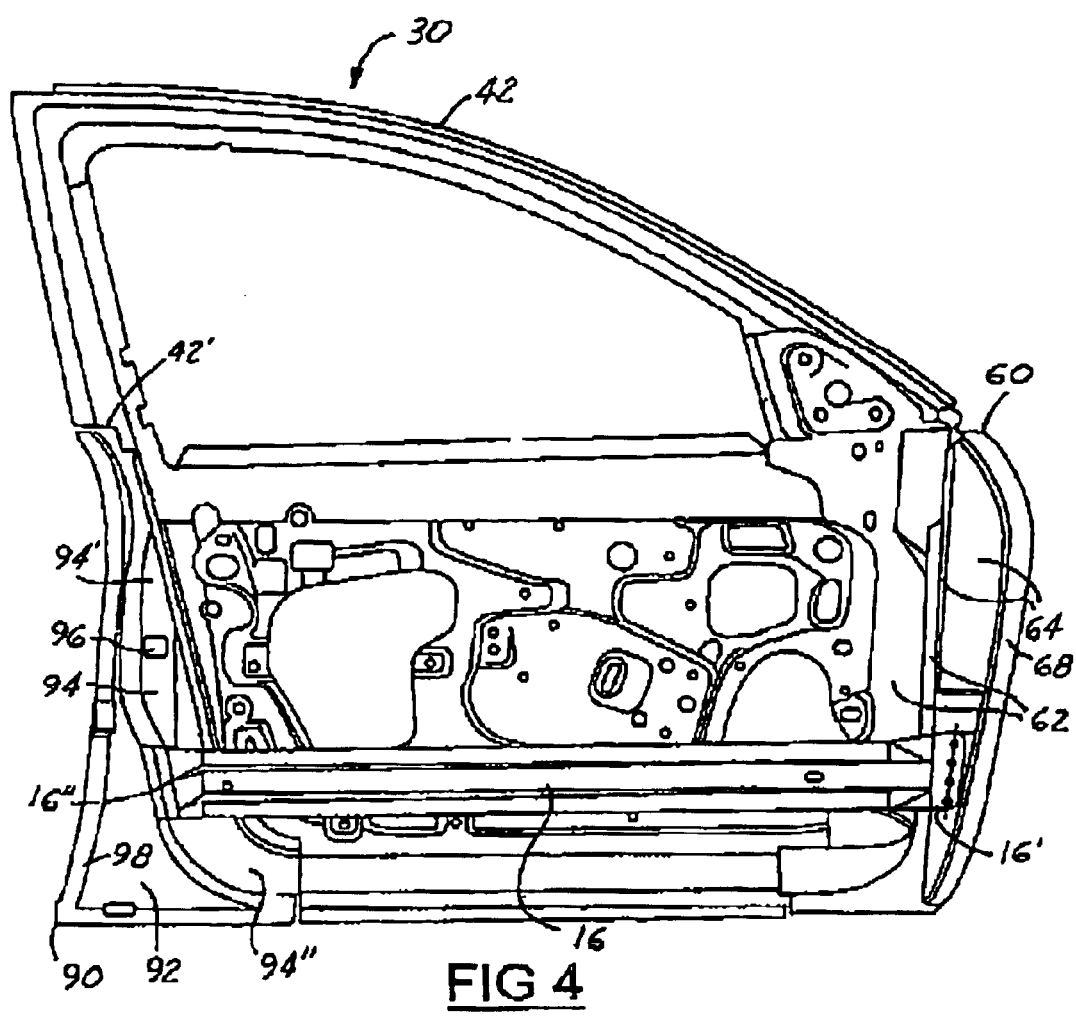
FIG. 4 is a front plan view of an inner door assembly with an intrusion beam integrated therein according to a preferred embodiment of the present invention.

Referring now to FIGS. 1 and 3, there is shown the second side member 90 of the inner door 30 according to a preferred embodiment of the present invention. The second side member 90 is similar to the first side member 50. The second side member 90 typically extends in a generally perpendicular direction from the inner panel 40. The second side member 90 has a partition portion 92 for separating the exterior of the door assembly 10 from the door cavity therein. Moreover, the partition portion 92 may determine the thickness of the door assembly 10 and consequently the size of the door cavity.

Also, the second side member 90 preferably is a single piece of metal stamped with a sufficient depth of draw to provide the desired thickness of the door assembly 10 without causing damage to the metal. As mentioned above, certain metals, i.e. aluminum, have lower formability characteristics than steel. Therefore, having the second side member 90 as an item separate from the inner panel 40 allows the second side member 90 to be formed in such manner so as to allow the door assembly 10 to achieve the required dimensions.

The second side member 90 has a columnar portion 94 which is intended to engage the second seat 46 of the inner panel 40. The columnar portion 94 also engages a foot 42' of the window frame reinforcement 14 so as to provide reinforcement thereto. Preferably, two-sided fasteners attach the columnar portion 94 to the second seat 46. However, a variety of other fasteners may be used.

The columnar portion 94 has an upper columnar portion 94' and a lower columnar portion 94". The columnar portion 94 typically has a latch aperture 96 integrally formed therethrough for receiving a latch device. Likewise, the second seat 46 has a latch hole 96' formed therethrough for mating with the latch aperture 96 and permitting the latch device to pass therethrough. The overlap of the upper columnar portion 94' and the second seat 46 provide sufficient strength to the inner door 30 for opposing forces typically imparted thereon by the latch device.

Similar to the boot portion 74 of the first side member 50, the lower columnar portion 94" of the second side member 90 is fixedly engaged to the second seat 46 to strengthen the overall torsional rigidity of the door assembly 10. The lower columnar portion 94" preferably is attached to the second seat 46 in a bottom rear corner of the door assembly 10. However, it may strengthen rigidity elsewhere as desired.

The partition portion 92 of the second side member 90 has a support flange 98 integrated therein for strengthening the door assembly 10. In this regard, the support flange 98 opposes forces imparted on the door assembly 10, which can cause flexing thereof.

The brace flange 68 and the support flange 98 have a first edge 18' of the outer door 18 and a second edge 18" attached thereto, respectively. Typically, a third edge 18''' of the outer door 18 is also attached to a bottom edge 48 of the inner panel 40.

While particular embodiments of the invention have been shown and described, numerous variations and alternate embodiments will occur to those skilled in the art. Accordingly, it is intended that the invention be limited only in terms of the appended claims.

What is claimed is:

1. An inner door for an automotive door assembly comprising:

an inner panel having a first seat and a second seat integrally formed therein;

a first side member fixedly coupled to said first seat;

a second side member fixedly coupled to said second seat, wherein at least one of said inner panel, said first side member, and said second side member is composed of aluminum metal.

2. The inner door as recited in claim 1 wherein said first side member has a first end of an intrusion beam coupled thereto, said second side member having a second end of said intrusion beam fixedly coupled thereto.

3. The inner door as recited in claim 1 wherein said first side member comprises:

a wall member having at least one hole integrally formed therethrough for receiving at least one hinge device; and at least one plate fixedly coupled to said wall members said at least one plate fixedly coupled adjacent to said at least one hole so as to reinforce said wall member.

4. The inner door as recited in claim 3 wherein said wall member has a divider portion for separating an exterior of the automotive door assembly from a door cavity thereof.

5. The inner door as recited in claim 3 wherein said wall member has a brace flange extending therefrom for reinforcing said wall member so as to reduce a door sag, said brace flange having a first edge of an outer door fixedly coupled thereto.

6. The inner door as recited in claim 3 wherein said wall member has a boot portion integrally formed therein for strengthening a torsional rigidity of the automotive door assembly.

7. The inner door as recited in claim 1 wherein said second side member has a columnar portion, said columnar portion operatively engaged between said second seat and a foot of a window frame integrated within said inner panel thereby stiffening said window frame.

8. The inner door as recited in claim 7 wherein said columnar portion has an upper columnar portion and a lower columnar portion, said upper columnar portion having at least one latch hole formed therein for receiving a latch device.

9. The inner door as recited in claim 8 wherein said lower columnar portion increases a torsional rigidity of the automotive door assembly, said lower columnar portion being located at a second corner of the automotive door assembly.

10. The inner door as recited in claim 1 wherein said second side member has a partition portion for separating an exterior of the automotive door assembly from a door cavity therein.

11. The inner door as recited in claim 1 wherein said second side member has a support flange extending therefrom with a second edge of an outer door attaching thereto.

* * * * *